June 13, 1933. J. S. McWHIRTER 1,913,499
BEARING AND METHOD OF ASSEMBLY THEREOF
Filed July 30, 1929 2 Sheets-Sheet 1
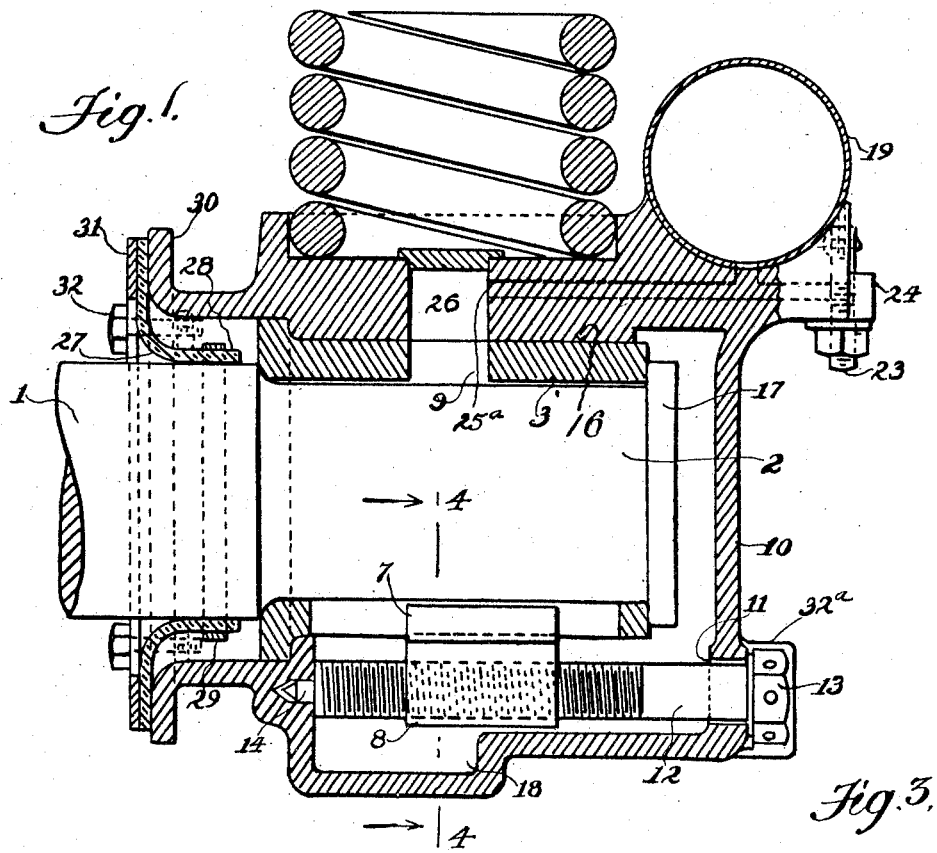
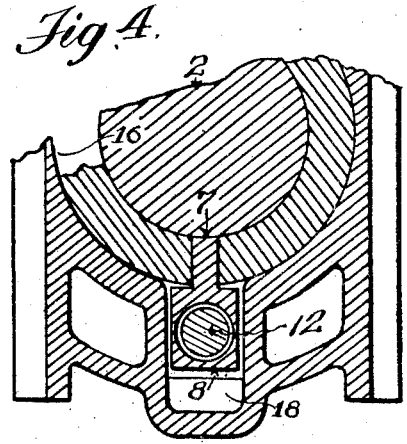
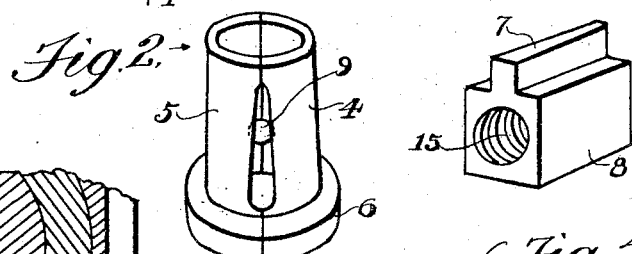
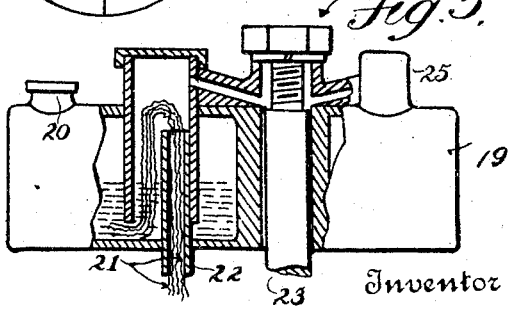
Inventor
JOHN S. McWHIRTER
By his Attorneys Harby & Harby June 13, 1933.  J. S. McWHIRTER  1,913,499
BEARING AND METHOD OF ASSEMBLY THEREOF
Filed July 30, 1929  2 Sheets-Sheet 2

Inventor
JOHN S. McWHIRTER
By his Attorneys Darby + Darby

Patented June 13, 1933

1,913,499

UNITED STATES PATENT OFFICE

JOHN S. McWHIRTER, OF SOUTHPORT, CONNECTICUT

BEARING AND METHOD OF ASSEMBLY THEREOF

Application filed July 30, 1929. Serial No. 382,143.

This invention relates to journal boxes and improvements in methods of manufacture and assembly of journal bearings and housing therefor.

It has heretofore been the practice in the railway art to employ journal, bearing and box constructions which have become more or less standardized in the art. Heretofore standard constructions of this nature for example the Master Car Builders' (M. C. B.) assembly consisted of the wheel, journal, the bearing and the housing or box. In the standard constructions it has been customary to make the box or housing of one piece allowing sufficient space under the journal to permit the housing to be lifted a sufficient distance to permit the bearing to be inserted between the top of the journal and the housing through an opening provided therefor in the end of the housing. Then the housing is permitted to be lowered into position and the assembly thus completed. The upper portion or surface of the journal and the bearing does not extend completely around the circumference of the journal.

The standard journal, bearing and housing assemblies are subjected to a number of serious disadvantages in use. In the first place, the opening in the housing which must be provided to permit the bearing to be inserted in place makes it possible for the loss of oil or other lubricant necessary for proper lubrication of the bearing and/or the loss of lubrication effect by ingress of dust, dirt, water or other extraneous matter. Therefore, it is necessary in the standard assembly to employ some form of closure for the end of the housing, making an additional part capable of rattle and noise and incapable of complete elimination of all of the troubles referred to. In the second place, it is a difficult mechanical operation to properly insert and fit the bearing on its journal within the housing. It is obvious that if a proper fit is not made, excessive wear, improper lubrication and all of the troubles incident to either thereof will occur.

In the next place where a bearing for only a portion of the circumference of the journal is employed lateral wear of the bearing is excessive and comparatively rapid resulting in lateral motion of the bearing on the journal, causing nosing or swaying of the trucks or cars, which is obviously objectionable. Furthermore it frequently happens for one cause or another that the bearing of the standard assembly becomes displaced from its normal position with the result that a hot bearing is obtained. The foregoing disadvantages of the standard assembly have been selected as illustrative of salient disadvantages without intending to specify all of the disadvantages incident to the present standard practice.

It is therefore, among the special purposes of my present invention to provide a journal, bearing and housing assembly and a method of assembly. These parts assembled together will overcome, among others, the foregoing disadvantages of the present standard practice.

I am well aware that these and similar disadvantages have been overcome by anti-friction bearings, of ball or roller type, but they have not so far as I am aware ever heretofore been overcome in any other type of bearing structure. It is therefore among the special purposes of my invention to provide a journal bearing and housing assembly which overcomes all of the foregoing or similar as well as incidental disadvantages in substantially the same degree as anti-friction bearings accomplish that result without the use of anti-friction bearing devices. It will therefore be apparent to those skilled in the art that a bearing of the construction of my invention having all of the features and advantages of an anti-friction except the elimination of friction but constructed of a sleeve bearing type and hence less expensive both initially and in maintenance makes available a bearing suitable for any purpose for which it may be used, but especially adaptable and advantageously used in the railway art.

Accordingly it is one of the principal objects of the present invention to provide an improved method of assembling a journal bearing within a solid housing, and particularly a method of assembling such a bearing on a recessed shaft or axle, that is, a shaft having a portion of the length thereof reduced in diameter to form a shoulder at one end and a flange at the other end of the reduced portion.

A feature of the invention resides in a novel arrangement and combination of parts whereby the recessed portion of a shaft may be provided with a bearing completely surrounding the same, together with a solid housing which may readily be positioned over said bearing, and to which the bearing may be rigidly fastened.

Another feature resides in the combination of a split bearing for a recessed shaft, or the like, and a solid housing for said bearing, together with means for expanding said bearing into the housing.

A further feature pertains to a recessed shaft or axle provided with a bearing, and a one-piece housing or backing for said bearing, said bearing being adjustably wedged within said housing and surrounding the said shaft to reduce end thrust.

A still further feature pertains to the organization and arrangement of elements which go to make up an axle box and bearing having long life, accurate fit, and which may be readily assembled on axles of the flanged end type.

Other features and advantages of the invention will be apparent upon a consideration of the following descriptions in the appended claims.

Referring to the drawings wherein like numerals designate similar parts throughout the several figures, Figure 1 is a view in vertical longitudinal of an axle box and journal bearing according to the invention:

Fig. 2 is a perspective view of one form of split bearing used in accordance with the invention:

Fig. 3 is a detail view of the bearing wedge member:

Fig. 4 is a partial cross-sectional view taken along the line 4—4 of Fig. 1:

Fig. 5 is a detail view of a preferred form of lubricating means used with the device of Fig. 1:

Figure 6:
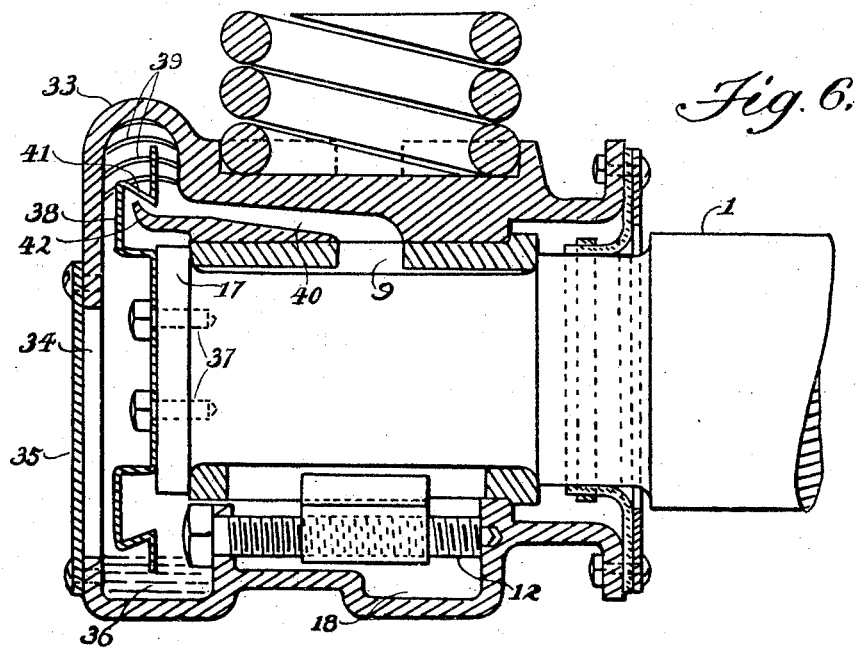
Fig. 6 shows another modification of axle box and bearing using a different manner of lubricating.

Referring more particularly to Figure 1, the numeral 1 designates an axle or shaft having at its bearing end a recessed or reduced portion 2 constituting what is known in the art as a standard M. C. B. journal. Surrounding the recessed end of the axle is the bearing brass 3 which is preferably made in two semi-cylindrical pieces 4 and 5, equal in length to that of the recessed portion 2 and having at one end a flange 6. One of the longitudinal edges of each half of the bearing brass is provided with a tapered notch and these tapered notches register with each other to provide in effect a tapered opening for the reception of the wedge projection 7 on the slidable member 8 (Fig. 3). On the other edge of each half of the brass there is a circular notch which, when the two halves of the bearing are fitted together, provide a circular opening 9 for the passage of lubricating material to the journal.

For the purpose of enclosing the journal and for rigidly retaining the bearing in adjusted position, there is provided a housing adapted to slide over the journal and bearing and having the right hand end 10 closed except for a small opening 11 through which passes the wedge adjusting screw 12. Screw 12 terminates at one end in the adjusting head 13 and at the other end in a reduced portion 14 which is adapted to enter a corresponding recess in the housing. As shown more clearly in Fig. 3 the slidable member 8 has an internally threaded bore 15 for engaging the threaded portion of screw 12. When the bearing and housing are assembled, as shown in Figure 1, the wedge 7 is positioned in the tapered opening provided between the contiguous edges of the bearing brasses and the wedge may, therefore, be moved longitudinally with respect to the screw 12, depending upon which way the latter is turned. Thus as the wedge 7 moves toward the right (Fig. 1) it expands the bearing members against the inner cylindrical wall 16 of the housing resulting in a rigid connection therebetween.

With the slidable member 8 and wedge 7 positioned on screw 12, as shown in Figure 1, it will be seen that the housing cannot be removed because of the engagement between the wedge 7 and the flanged end 17 of the journal. In order, therefore, to permit the housing to be slipped off the journal a depression, or trough 18 is provided in the lower wall of the housing and in alignment with screw 12. When screw 12 is turned to loosen the wedge the member 8 moves toward the left until it reaches the limit of its movement where it is in registry with trough 18. As screw 12 is further rotated the member 8 abuts against the inner wall of the casing channel in which it works, and hence remains stationary causing the screw 6 to disengage or to unscrew from the wedge member and allowing the latter to drop into depression 18. With the wedge in this position the housing may readily be slipped endwise off the journal.

Inasmuch as the bearing brass completely surrounds the reduced journal portion 2 the usual method of lubrication by conducting lubricating material to the lower face of the journal is unsuitable. Furthermore, since the bearing is housed within a casting and clamped therein throughout its circumferential periphery, the bearing may be turned down to give the effect of a very close machine fit with respect to the journal and is not disturbed by vibration of the journal and associated parts, accordingly special means for effecting proper lubrication must be employed. For the purpose of effecting this lubrication it is preferred to use an automatic lubricating device of the type disclosed in Patent No. 1,625,074 granted April 19, 1927. A detailed view of this device is shown in Fig. 5 and comprises a cylindrical oil reservoir 19 having a closable filler opening 20. A reversely looped wick 21 is mounted within the reservoir and causes the oil to be fed by combined capillary and gravity action through the outlet tube 22. A bolt 23 passes through the reservoir for the purpose of anchoring the latter to the extension 24 on the axle housing (Fig. 1). The reservoir is provided with any suitable valve means 25 for controlling the pressure of air within the reservoir in accordance with the temperature of the bearing parts. For a detailed description of the manner of feeding oil in this type of device reference may be had to U. S. Patent No. 1,625,074 referred to hereinabove.

When the oiler is anchored on the axle housing the wick 21 registers with the end of the oil groove 25ª which passes through the wall of the axle housing and communicates with a vertical oil feed chamber 26 which is in registry with the oil feed opening 9 in the bearing brass above described.

For the purpose of preventing access of dust, moisture and other foreign matter to the interior of the axle box a guard comprising a flexible member 27 is provided. Member 27 is preferably of leather, or other similar substance and has a cylindrical body portion 28 which surrounds the axle 1 and is held in place thereon by means of the ring 29. The dust guard is adapted to be clamped against the flanged rim 30 of the axle housing by means of a ring 31 and suitable bolts 32. This arrangement of dust guard has been found to be very efficient with the type of bearing and housing disclosed because of the efficient manner of retaining the cylindrical portion of the dust guard in contact with the axle.

From the foregoing description it will be seen that the manner in which the bearing and housing are assembled over the axle is as follows:

Both halves of the brass are positioned around the recessed or reduced end of the axle and with the tapered, notched edges thereof disposed at the upper side of the journal. The axle housing with the member 8 in trough 18 is then slipped endwise over the bearing and the housing is turned axially, until the wedge enters the tapered opening in the bearing. The screw 12 is then passed through opening 11 and threaded through bore 15 of member 8. The wedge member is now held in the tapered notch and the housing may be turned to the proper position as shown in Figure 1 with the wedge member below the journal. The screw 12 is thereupon further turned until the wedge has been moved a sufficient distance to properly expand the halves of the bearing within the housing. The screw 12 may then be locked in its adjusted position in any well known manner, preferably by passing a cotter pin through the head 13 and a corresponding opening in lateral projection 32ª on the housing. With the housing and lining thus rigidly clamped to each other the opening 9 in the bearing is in alignment with the oil feed chamber 26 in the housing and the lubricating means shown in Fig. 5 may then be bolted to the extension 24. The dust guard 27 which has been previously placed in position around the enlarged portion of the axle is secured in position by bolts 32.

From the foregoing description it will be seen that because of the flanged and shouldered ends of the journal and the rigid connection between the journal bearing and the axle housing that the undesirable effects of end thrust are reduced to a minimum and there is less likelihood of the bearing becoming loose. Because of the efficient manner of lubrication and guarding against foreign matter the bearing has a much longer life, and the onepiece housing may be assembled in position simply by sliding over the end of the journal.

Fig. 6 shows a modified form of axle housing and lubricating means. In this embodiment the parts corresponding to those shown in Figs. 1 and 4 are designated by the same numeral.

It will be noted, however, that the axle housing 33 is shown in this instance as provided at its left-hand end with an opening 34 and a removable cover 35 for gaining access to the wedge adjusting screw 12. Instead of the automatic oiler shown in Figure 1 the bearing of Fig. 6 is lubricated by a "splash" system. For this purpose the end of the housing 33 is formed with an oil trough 36, and attached to the flanged end 17 of the journal by suitable bolts 37 is an oil splasher 38 formed from a metal strip into suitable shape for this purpose. The interior surface of the upper left hand end of the housing is grooved as indicated by the numeral 39 so that when the axle is rotating at high speeds the oil which is carried from the trough 36 by the bent ends of member 38 is thrown by centrifugal force onto the wall of the housing and is conveyed along the grooves 39 into the oil distributing groove 40 in the housing. Groove 40 corresponds to groove 25, of Fig. 1, and communicates with the opening 9 in the bearing members. On the other hand when the axle is rotating at low speeds the centrifugal force is insufficient to splash the oil against the wall of the housing, but the oil which is carried around by member 38 drains from the portions 41 of the oil splasher onto the oil guide 42 which is formed integrally with the casting. The remaining parts of this modification, including the dust guard, are similar to those of Fig. 1, and the manner of assembling the housing upon the journal is substantially the same with the exception, however, that the cover 35 must be removed during the assembly operation.

Figure 7:
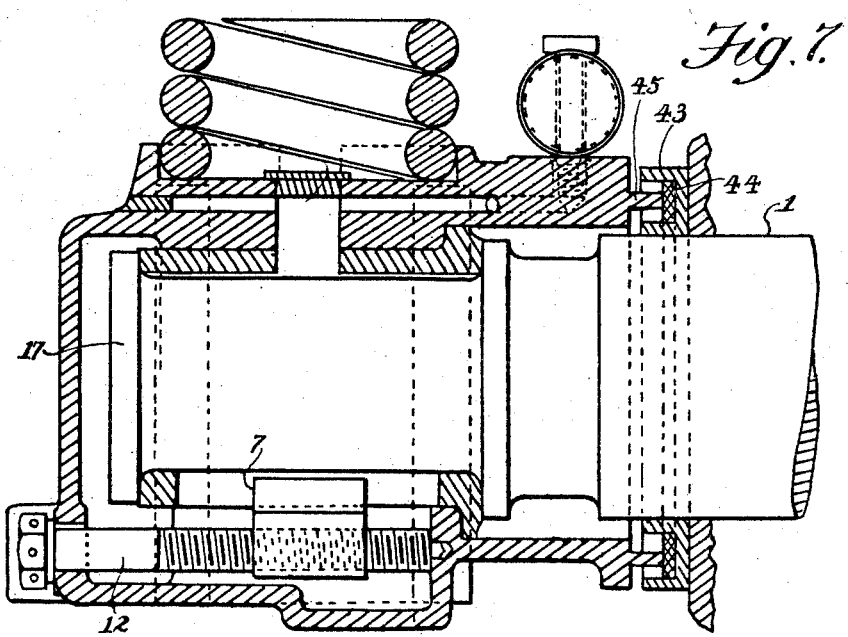
Fig. 7 is a further modification of Fig. 1 employing a different type of dust guard.

Fig. 7 shows a further modification of Figure 1, and like parts are designated by the same numeral. In this modification, however, a different type of dust guard is employed and comprises a channeled collar 43 which is pressed onto the axle 1. In the bottom of the channel is a dust guard ring 44 of felt, leather, or other suitable material. Cooperating with the dust guard ring is an annular flange 45 which is formed integrally on the housing casting and which projects into the channel in member 43 and butts against the ring 44. Because of the centrifugal force of the axle during rotation moisture is prevented from gaining access to the journal and the ring 44 likewise prevents the access of foreign particles. The manner of assembling the axle box in this modification is the same as that described in connection with Figure 1, and a further description is not believed necessary at this point.

While in the foregoing descriptions specific apparatus has been described it will be understood that the invention is not to be limited thereto since in its broad aspects the invention enables a unitary or one piece housing to be assembled on a recessed shaft or axle, or on a shaft or axle having a reduced portion intermediate its ends.

What is claimed is:

1. The method of assembling a bearing and a housing therefor on a journal having a flanged end, which comprises positioning a split bearing around said journal, inwardly of the flanged end thereof, passing a housing endwise over the flanged end of the journal to completely enclose the bearing, and clamping the bearing sections rigidly against the internal annular wall of the housing.

2. The method of assembling a journal bearing and a housing upon the reduced portion of a shaft, which comprises first positioning the bearing around the reduced shaft portion, then positioning the housing around the bearing, and expanding the bearing against the inner wall of the housing.

3. The method according to claim 2, in which a split bearing is employed and the expanding is accomplished by drawing a wedge between the bearing sections.

4. The method of assembling a journal bearing and a separate unitary housing on an axle having a portion of reduced diameter intermediate its ends, which comprises positioning said bearing around and within said reduced portion, passing said housing endwise over said bearing, and rigidly clamping said bearing against the inner wall of said housing.

5. In combination a shaft having a reduced bearing portion intermediate its ends, a split bearing for said reduced portion, a unitary housing closed at one end surrounding said bearing, an adjustable wedge carried by said housing, and means for moving said wedge into and out of engagement with said bearing while said bearing and housing are in assembled condition on said shaft.

6. In an axle box, the combination of an axle having a grooved bearing portion, an expansible bearing member fitting within said groove, a unitary housing open at one end only, means for expanding said bearing within said housing, said housing having the open end for allowing said housing to be passed over the bearing, a guard ring secured to the open end of said housing, and having a portion rubbing on said axle.

7. A combination as described comprising an axle of reduced diameter near the end to form an annular groove, a pair of semi-circular bearing brasses in said groove shaped to form a wedge shaped groove along one line of separation, a single piece housing open at one end and having a substantially cylindrical seat into which the brasses slip when assembled on the shaft, a rotatable threaded member in said housing having a tool receiving head projecting through an opening in the housing and a wedge threadedly mounted on said member and lying in the groove in the brasses, whereby they are expanded tightly onto the circular seat of the housing.

8. A combination comprising a shaft having an annular groove near one end, a bearing member in said groove comprising semicircular brasses each recessed along one line of separation to form a wedge shaped opening, and each having a lip at one edge forming an annular flange when assembled on the shaft, a substantially closed housing open at one end and having a substantially cylindrical seat in which the bearing member rests, and means engaging the housing and recess in the bearing member for expanding the brasses onto the cylindrical seat and engaging the annular flange with the end of the cylindrical seat to hold all the parts in assembled and operative relation.

9. A combination as described comprising a bearing housing of substantially closed construction open at one side only, a seat formed in said housing having a shoulder at one end, a shaft projecting into the housing through the open end having an annular recess near the end, flanged bearing brasses in said recess and aligned with said seat, and means interposed between the housing and brasses for firmly forcing them against said seat and their flanges against said shoulder, whereby the bearing brasses are held against rotation and longitudinal movement.

10. A combination as described comprising a bearing housing of substantially closed construction open at one side only, a seat formed in said housing having a shoulder at one end, a shaft projecting into the housing through the open end having an annular recess near the end, flanged bearing brasses in said recess and aligned with said seat, means interposed between the housing and brasses for firmly forcing them against said seat and their flanges against said shoulder, whereby the bearing brasses are held against rotational and longitudinal movement, and flexible sealing means closing the open end of the housing and surrounding and contacting the shaft.

In testimony whereof I have hereunto set my hand on this 22 day of July A. D., 1929.

JOHN S. McWHIRTER.